Jan. 20, 1925.
M. P. FAVRE-BULLE
1,523,762
APPARATUS FOR REGULATING THE AMPLITUDE IN ELECTROMAGNETIC CLOCKS
Filed April 26, 1922    3 Sheets-Sheet 1
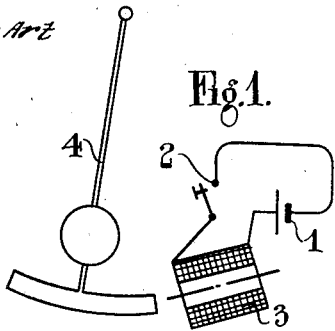
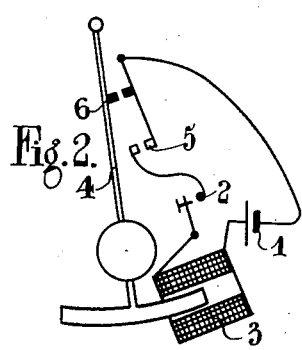
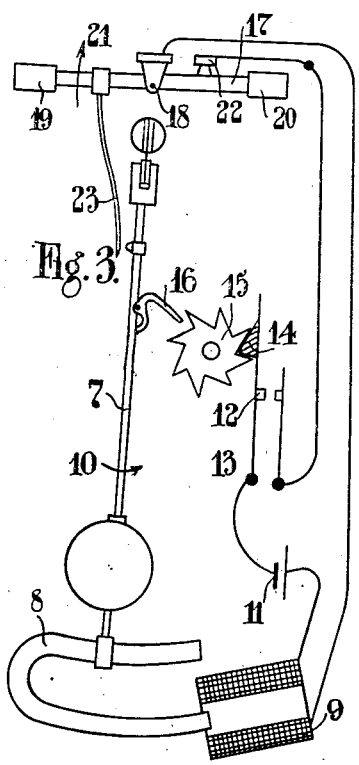
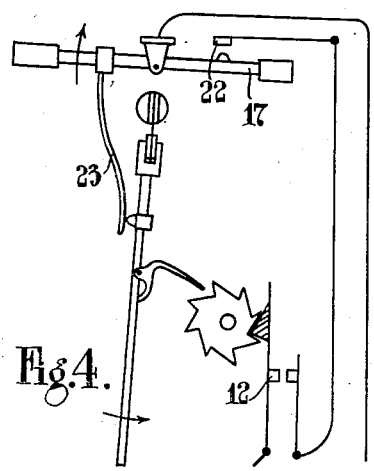
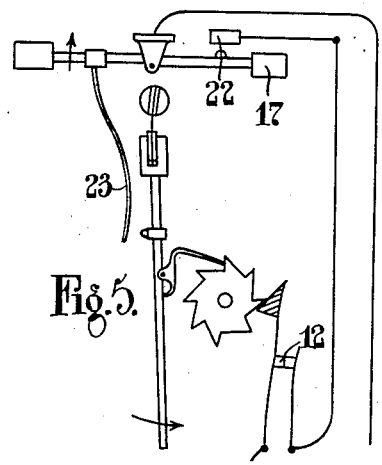
INVENTOR
M. P. Favre-Bulle,
BY Marks&Clerk
ATTORNEYS INVENTOR
M.P. Favre-Bulle,
BY Marks/Clerk
ATTORNEYS Jan. 20, 1925. 1,523,762
M. P. FAVRE-BULLE
APPARATUS FOR REGULATING THE AMPLITUDE IN ELECTROMAGNETIC CLOCKS
Filed April 26, 1922  3 Sheets-Sheet 3
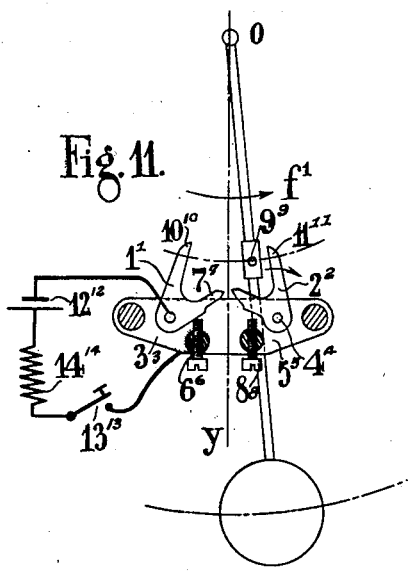
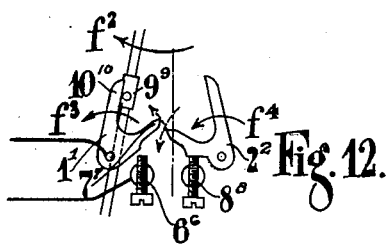
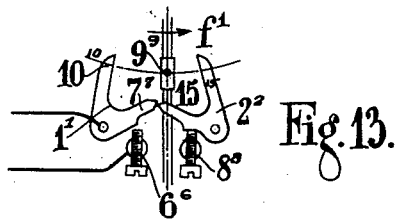
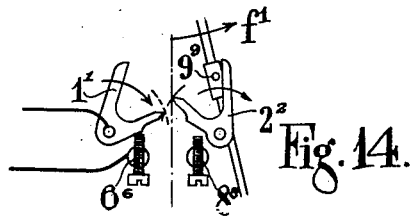
INVENTOR
BY M. P. Favre-Bulle,
ATTORNEYS Patented Jan. 20, 1925.

1,523,762

UNITED STATES PATENT OFFICE.

MAURICE PHILIPPE FAVRE-BULLE, OF BOULOGNE, FRANCE.

APPARATUS FOR REGULATING THE AMPLITUDE IN ELECTROMAGNETIC CLOCKS.

Application filed April 26, 1922. Serial No. 556,773.

*To all whom it may concern:*

Be it known that I, MAURICE PHILIPPE FAVRE-BULLE, a citizen of the French Republic, residing at Boulogne, France, have invented certain new and useful Apparatus for Regulating the Amplitude in Electromagnetic Clocks, of which the following is a specification.

This invention relates to electro-magnetic clocks wherein the pendulum or rocking beam operates an interrupter that sends periodically into one or more coils, current impulses which give rise to attractions that assure the maintenance of the motion of the pendulum.

In the clocks, the magnitude of the electro-magnetic attractions acting upon the pendulum depends on the magnitude of the electro-motive force of the source of electricity that feeds the clock, so that any variation of this electro-motive force will produce a variation of the amplitude of the oscillations of the pendulum.

Variations of the amplitude can likewise be produced by an increase of the passive resistances of the mechanism driving the hands. These variations are harmful to the regular working of the clock, especially where pendulums are used whose amplitudes of oscillation reach values for which isochronism can no longer be considered to be practically sufficient.

The present invention relates to a regulating system that allows of maintaining the amplitude at a practically constant value even if considerable variations should occur in the values of the electro-motive force of the source of electricity and the passive resistances. Moreover, the operation of this regulator is not harmful in any way to the regularity of the motion of the pendulum, thus enabling a very great precision to be attained in the working of the clock.

This regulating apparatus consists of an auxiliary interrupter arranged in series with the main interrupter in the electric circuit, and operated by the pendulum immediately the latter attains a certain amplitude which is the normal amplitude it is desired it should have, and which is less than the amplitude which it would assume under the influence of the current impulses that are regulated by the main interrupter alone.

By means of this apparatus, if the amplitude is less than its normal magnitude, the auxiliary interrupter does not come into operation, and the pendulum under the influence of the current impulses regulated by the main interrupter alone, increases its amplitude until it has reached this said normal magnitude which it would have a tendency to exceed.

So soon as this magnitude is reached, the auxiliary interrupter comes into operation and reduces or suppresses the current impulses that are regulated by the main interrupter, thereby causing a diminution of the amplitude of the pendulum.

This amplitude therefore always keeps on one side or the other of the prescribed normal magnitude, and differs extremely little therefrom, so that in practice a regulation can be attained which is sufficiently precise to allow of considering that the amplitude remains always of the prescribed normal magnitude.

In order to enable the invention to be understood, several constructional forms of the invention are hereinafter described and illustrated in the accompanying drawings.

In these drawings:—

Figure 1 illustrates diagrammatically the electric circuit of the electro-magnetic clocks to which this invention relates.

Figure 2 illustrates diagrammatically the electric circuit of an electro-magnetic clock provided with the apparatus for regulating the amplitude; forming the subject matter of the invention.

Figure 3 illustrates a first constructional form of the amplitude-regulator applied to an electro-magnetic clock of a known type, shown by way of example.

Figure 4 and Figure 5 show two different positions of the regulator illustrated in Figure 3.

Figures 11 to 14 illustrate further modifications.

Figure 7:
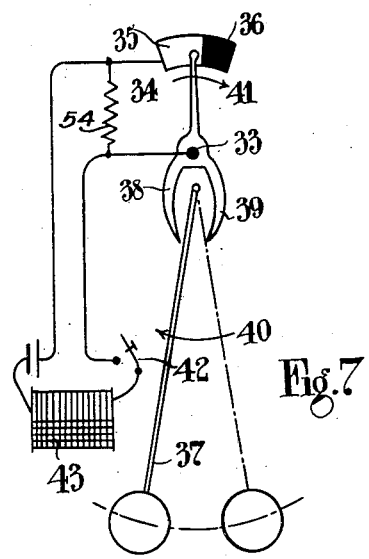
Figure 7 and Figure 8 illustrate diagrammatically a second constructional form of the invention.

For the sake of clearness of the following description, let us first recall to mind the general principle of the electro-magnetic clocks to which this invention relates.

The electric circuit of these clocks, which is illustrated diagrammatically in Figure 1, comprises a source of electric current 1, an electric interrupter 2, and one or more coils 3 adapted to exert attractions upon the pendulum 4 when the interrupter is closed, and current is flowing in the coils. The interrupter is operated by the pendulum itself at selected moments in such a manner that the current impulses are produced in the sense of moving the pendulum and they allow of maintaining its oscillations. The clock therefore behaves like an electric motor of a particular kind, and the pendulum acquires a normal amplitude which depends upon the magnitude of the electromotive force of the source of current and of the passive resistances which it must overcome.

According to the present invention there is included in the electric circuit of the clocks of the type specified, in series with the interrupter 2, a second interrupter 5 (see Figure 2) adapted to be operated by the pendulum under the conditions hereinafter set forth.

The clock is constructed in such a manner that if there were no regulating apparatus the clock would work with an amplitude greater than the constant value (a) which it is desired it should have, by means of the regulator forming the subject matter of this invention. In these conditions when the amplitude of the oscillation is less than (a) the driving effort is greater than the resisting effort and the amplitude of the pendulum increases more and more.

The drive of the regulating interrupter 5 is so constructed that for amplitudes smaller than (a) this interrupter 5 remains closed and consequently the pendulum will work as if there were no regulator making gradual increasing amplitudes, but when there is a tendency for the amplitude (a) to be exceeded the regulating interrupter 5 is also operated by the pendulum and will open periodically the electric circuit of the clock. The moments during which the regulating interrupter 5 comes into operation are determined in such a manner that the coil 3 will cease to receive the successive current impulses that were sent to it by the main interrupter 2. The result is that the pendulum does not receive any longer any impulses and its oscillations become gradually smaller until they reach the value slightly less than (a). From that moment the reguating interrupter 5 remains constantly closed and the pendulum receives fresh motive impulses which may increase its amplitude until the regulator comes again into operation as just stated, in such a manner that the amplitude of the pendulum will vary very little and remain always very close to (a).

Generally speaking, the operation of the movable part of the regulating interrupter 5 is effected by means of a stop 6 secured to the pendulum and acting only when the amplitude exceeds the value (a) which it is proposed to give to the pendulum. Immediately the stop 6 ceases to act upon the regulating interrupter 5, the latter is returned into its position of closure by the action of its own weight or of a returning spring, or it may be by the action of the pendulum itself. In any case, the return of the regulating interrupter into the position of the closure is suitably retarded so that the duration of the opening of the circuit will be sufficient to enable it to last during a portion of the duration of the closure of the main interrupter 2, in order that the driving impulses shall be suppressed or sufficiently reduced. The retarding of the closure of the regulator 5 may be produced by utilizing the inertia of the moving parts or rubbing parts or by any other known means.

A large number of apparatus will allow of satisfying the above stated conditions. Only a few of these are herein described by way of example and solely by way of explanation.

Figures 3 to 5 illustrate a first constructional form of the regulator constituting the subject matter of the present application applied to an electro-magnetic clock of a known type comprising a pendulum 7 to the end of which there is fixed a horse-shoe magnet 8 directed by a coil 9 at each swing of the pendulum in the direction of the arrow 10 in the ordinary manner of working. The electric circuit comprises only a source of electric current 11, the coil 9 and an interrupter 12 which is operated periodically by the pendulum itself and closes the circuit during a part of the swings in the direction of the arrow 10. The contact of the interrupter 12 is mounted on a leaf spring 13 carrying a tappet 14 bearing upon a ratchet wheel 15 upon which acts a finger 16 with the pendulum 7.

According to this invention, a second interrupter serving as a regulator is included in the electric circuit. The moving part of this interrupter consists of a rod 17 articulated at a fixed point 18. The rod 17 carries weights 19, 20 and it is capable of rocking when it receives a push in the direction of the arrow 21. The weights 19, 20 are slightly different as to weight so that by their influence this rod 17 has a tendency to turn in a direction opposite to that of the arrow 21 and to come to rest against the fixed stop 22 which has likewise the function of an electric contact. The regulating interrupter 5 of the apparatus based on the principle illustrated in Figure 2 consists of a rod 17 and the stop 22, the electric circuit terminating at one end at the conducting rod 17 through the medium of the pivot 18 and at its other end at the stop 22.

On the balance beam 17 there is fixed a stop constituted preferably by a flexible bar 23. The pendulum 7 comes in contact with this stop when it swings with the amplitude (a) which it is desired it should have permanently. When the amplitude of the pendulum exceeds the value (a) the balance beam 17 receives a push in the direction of the arrow 21 and it rocks on its axis 18. It is then returned by gravity into its initial position. The weights 19, 20 and their distances apart are made such that the period of the oscillation of the balance beam 17 shall approximate that of the pendulum 7 and consequently the balance beam shall be returned slowly into the position of contact with its stop 22.

The coil 9 and the power of the source of electricity 11 are made such that the clock shall operate when the regulating interrupter 12 is closed with a normal amplitude greater than (a).

The clock furnished with its regulator works constantly under the following conditions:—

When the amplitude is less than (a) the pendulum rod does not reach the stop 23 and the regulator rod 17 remains in contact with the stop 22. The regulating interrupter is consequently closed, and the main interrupter 12 operated by the pendulum, allows a current impulse at each swing of the pendulum in the direction of the arrow 10. The amplitude therefore becomes greater and greater and finally reaches the amplitude (a), and would have a tendency to exceed this latter. At this instant the pendulum rod 7 meets the stop 23, and the balance beam 17 receives a push and turns in the direction of the arrow 21. The regulating interrupter 22 is consequently open until the balance beam 17 returns into its initial position, but by reason of the inertia of this part and of the adjustment given to its duration by oscillation, the circuit is still open when the main interrupter 12 is closed by the pendulum 7 at midpoint of its following swing.

The opening of the circuit remains so long as the amplitude of the pendulum is greater than (a) and since the coil does not receive any current the oscillation of the pendulum will be damped. But when the amplitude becomes slightly less than the value (a) the regulating interrupter 22 remains constantly closed and the pendulum receives anew periodical impulses and has a tendency to exceed the amplitude (a) whereby the working of the regulator is started again as hereinbefore described.

It will thus be perceived that the amplitudes of the swing of the pendulum are maintained automatically at a substantially constant value which depends only on the position of the stop. The electro-magnetic apparatus may be so constructed as to give strong impulses to the pendulum enabling the pendulum to work with the amplitude (a) even if the source of electric current should diminish or if the passive resistances should increase in some little degree.

The regulator just described is extremely sensitive and it does not cause any appreciable loss of energy because in normal working it is sufficient if the pendulum rod shall just touch the flexible stop 23 for the rod 17 to move a short distance away from the contact 22 and open the circuit. The energy required for operating the balance beam 17 is extremely small; further the elasticity of the rod 23 allows of diminishing also the slight shocks that are produced when the amplitude exceeds the value (a). These slight shocks, however, are not harmful in any way to the regulation of the clock because they have a tendency to diminish the duration of the period, and the inertia of the balance beam 17 may be regulated so that this effect shall compensate exactly for the delay due to the increase in the amplitude. In this manner a very great precision of working of the clock can be achieved.

Figure 6:
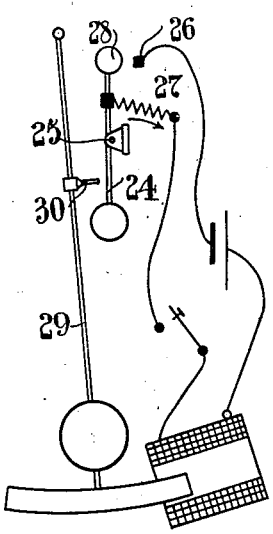
Figure 6 illustrates diagrammatically a modification of the construction of Figure 3.

Figure 6 illustrates diagrammatically another constructional form based on the principle of the amplitude regulator above described. The regulating interrupter consists in a vertical rocking beam 24 pivoted at 25 and maintained normally in contact with the stop 26 owing to the action of the spring 27. The electric circuit terminates on one hand at the stop 26 and on the other hand at the spring 27 and passes thence to the rocking beam. The electric contact is produced between this rocking beam and the stop 26 as in the case of the foregoing regulator. The period of oscillation of this rocking beam 24 is so regulated as to be approximate to that of the pendulum. This result can be obtained easily with a rocking beam of small dimensions by prolonging the swing of the rocking beam upwards beyond the pivot point 25 and providing it with a weight 28 like metronome pendulums. There is likewise mounted on the pendulum 29 a stop 30 which acts upon the rocking beam 24. When the amplitude of the pendulum exceeds the value (a) operation is the same as that of the regulator illustrated in Figures 3 to 5.

It is to be understood that instead of utilizing as the moving part of the regulating interrupter a pendulum apparatus which is returned by its own weight or by a return spring into position for closing the circuit there may also be employed the motion of the pendulum itself for returning the regulating interrupter into the position of closure.

Figure 8:
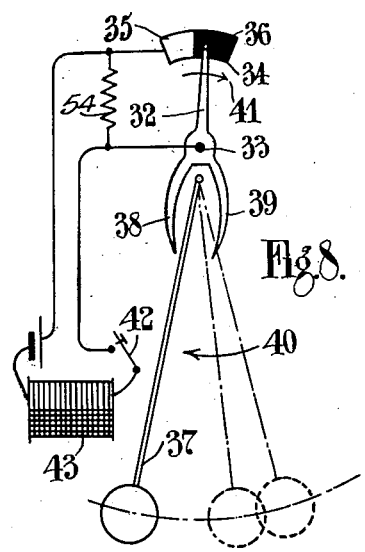

An example of this last apparatus is described hereinafter and is illustrated in Figures 7 and 8 of the accompanying drawings.

The moving part of the regulating interrupter consists in a contact arm 32 pivoted at 33, the end 34 of which can rub either on the contacting surface 35 or on the insulating surface 36 of a segment arranged as indicated in the diagrammatic Figures 7 and 8.

An electric circuit terminates at the arms 32 and at the contacting surface 35 of the said segment and the interrupter is closed in the position of Figure 7 and is open in the position shown in Figure 8.

The pendulum rod 37 swings between two fingers 38 and 39 which are secured to the arm 32 and have the function of stops controlling the regulating interrupter. The relative proportions and positions of these parts are such that when the amplitude is less than ($a$) the regulating interrupter is closed as shown in Figure 7.

When the amplitude exceeds the value ($a$) the pendulum is swinging in the direction of the arrow 40, acts upon the finger 38 and causes the arm 32 to turn in the direction of the arrow 41. The end 34 of this arm is brought upon the insulating portion 36 of the segment and the circuit is opened.

The regulating interrupter remains in this position during the greater part of the return swing of the pendulum and the interruption of the circuit coincides with the closing of the main interrupter 42, so that the coil 43 no longer receives any current impulses. At the end of the swing of the pendulum in the direction opposite to the arrow 40 the regulating interrupter is returned into its position of closing the circuit by the action of the finger 39 which is actuated by the pendulum rod. The working continues identically the same until the amplitude has been sufficiently reduced to ensure that the arm 32 rubs only upon the contacting portion and that the current impulses shall be sent again into the coil 43 during the swinging of the pendulum in the direction of the arrow 40.

The amplitude then has a tendency to increase more and more and the regulator acts to limit the deviations on either side of the value ($a$) to a very low amount as in the other systems.

It is obvious that the constructional forms hereinbefore described are given solely by way of example and in order to enable the invention to be properly understood, but recourse may be had to other constructional arrangements in order to carry into practical effect the chief principles of the regulator forming the subject-matter of the invention. In particular, instead of the parts articulated on pivot pins such as those marked 17 shown in Figures 3 to 5, rocking beams suspended by flexible strips may be employed.

Instead of a rotary interrupter such as the one 32 shown in Figures 7 and 8 there may be employed an interrupter having a moving part adapted to slide or to roll, operated by means of a finger secured to the pendulum. A constructional form of a regulating interrupter of this kind is illustrated by way of example in Figure 9.

The moving part of this interrupter consists of a cylindrical rod 44 terminating in an insulating part 45 and guided in the two conducting rings 46 and 47 and capable of moving laterally when the finger 48 (carried by the pendulum 49 and movable in the direction of the arrow 50 or the arrow 51) acts upon the parts 52 and 53 fixed on the rod 44.

Figure 9:
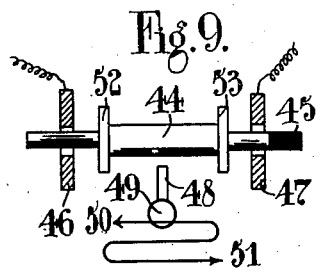
Figure 9 illustrates a different constructional form of this regulator.

The electric circuit terminates at the conducting rings 46 and 47 which are short-circuited by the rod 44 in the position shown in Figure 9. The circuit is opened when the rod 44 is moved towards the left and the insulating portion 45 comes in contact with the ring 47.

The arrangement of the parts is such that the interrupter is closed when the amplitude is small and the interrupter is open when the amplitude has a tendency to exceed the value ($a$). The parts 52 and 53 have the same function as the fingers 38 and 39 of Figures 7 and 8. It is to be noted that the part 44 can turn freely and under these conditions the electric contact is effectively cleaned and wear is reduced to a minimum.

Likewise, without departing from the nature of the invention a regulator may be employed whose interrupter acts by reducing the value of the duration or strength of the current feeding the clock, instead of suppressing it entirely. This result may be attained in particular by constituting the regulating interrupter by a contact device whose movable contact piece is caused to vibrate by means of any suitable device immediately the pendulum tends to exceed its normal amplitude.

In the case of the apparatus illustrated in Figures 3 to 5 the movable contact piece of the contact device is caused to enter into vibration if the period of oscillation of the regulating rocking beam is shorter than that of the pendulum. Under these conditions, when the amplitude of the pendulum has a tendency to exceed the value ($a$), the slightest contact with the stop 23 will have the result of causing the rod 17 to make vibrations which will continue over into the period of closure of the main interrupter 12 and thus limit the mean value of the strength of the current flowing in the coil 9 owing to the interruptions produced in the circuit by the vibrating contact piece.

Figure 10:
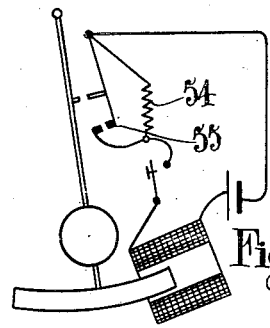
Figure 10 illustrates diagrammatically an improved construction which is applicable to all the previously described systems.

Likewise, the regulating interrupter comprised in all the before described systems, may be shunted by means of a resistance 54 as indicated in the diagrammatic Figure 10. When the regulating interrupter 55 is closed, the said resistance is short-circuited, and the current impulses attain their maximum values. When the regulator comes into operation and the interrupter 55 is open, the resistance 54 is included in the circuit and it limits to a lower value the strength of the current impulses. It is sufficient, for this resistance to be sufficiently great, to cause the amplitude to have a tendency to fall below the value ($a$), in order that the operation of the regulator shall take place in conditions identical with those of the before described systems.

The regulating interrupter apparatus might equally well be carried by the pendulum itself, and be operated by fixed stops or under the influence of the different inclinations of the pendulum.

The regulator illustrated by Figures 11, 12, 13 and 14 comprises members $1^1$ and $2^2$ of fork-shape pivoted at $3^3$ and $4^4$ on a fixed frame $5^5$.

The member $1^1$ can come in contact with the insulated stop constituted by the screw $6^6$. In this position the arm $7^7$ of this member holds back the member $2^2$, and prevents the latter from coming in contact with the stop constituted by the screw $8^8$.

The pendulum carries a driving finger $9^9$ which can act alternatively upon the arms $10^{10}$ and $11^{11}$ of the members $1^1$ and $2^2$ if the amplitude of the oscillations of the pendulum exceeds the normal amount which it is the object sought to be achieved by the regulation.

If the amplitude should be slightly less than the said normal amount, the finger $9^9$ will act only upon the arm $11^{11}$. The operation then takes place as shown in Figure 11. The member $1^1$ remains constantly in contact with the stop $6^6$.

The members $1^1$ and $6^6$ are included in the electric circuit that also includes the battery $12^{12}$, the periodic interrupter $13^{13}$ and the coil $14^{14}$, by virtue of which the pendulum receives by any known means a short impulse in the direction $f_1$ each time it passes in this same direction in the vicinity of the vertical line $o-y$.

According to the principle of this invention, these driving impulses are greater than the resistances, and the amplitude increases more and more. At the end of a certain number of oscillations the finger $9^9$ comes, at the end of its stroke in the direction $f_2$, against and acts upon the arm $10^{10}$ of the member $1^1$ as shown in Figure 12.

The member $1^1$ turns in the direction $f_3$, and the arm $7^7$ releases the member $2^2$ which falls back in the direction $f_4$ on to the stop $8^8$.

When, in its return movement in the direction $f_1$, the finger $9^9$ leaves the arm $10^{10}$ as shown in Figure 13, the member $1^1$ remains at a slight distance away from the contact screw $6^6$, because the arm $7^7$ is stopped by the end of the arm $15^{15}$ of the member $2^2$, as is clearly shown in Figure 13.

During almost the whole of the swing $f_1$ of the pendulum the electric contact of the member $1^1$ with the member $6^6$ remains broken, and the current impulse as sent out by the contact $13^{13}$ does not take place (see Figure 11). At the end of the swing or stroke in the direction $f_1$, the arm $9^9$ acts upon the member $2^2$, and releases the member $1^1$, as shown in Figure 14.

The operation continues in that manner, and owing to the absence of driving impulses the amplitude diminishes gradually until the finger $9^9$ ceases to act upon the member $1^1$. At this instant the driving impulses begin anew, and the amplitude is thus maintained at an amount which is very little different from that which it is desired to obtain by the regulating operation.

This construction has the advantage of enabling the friction to be reduced to a minimum, and of causing the contact of the member 6 to be broken and made very readily.

Having now described my invention what I claim as new and desire to secure by Letters Patent is:—

1. In an electro-magnetic clock the combination of an oscillatory member whose amplitude is to be regulated to a constant value, means electrically energised to give the oscillatory member added impulse when oscillating, a main interrupter for sending out periodically said impulses, an electric circuit in which the main interrupter is located and with which the electrically energised means for imparting added impulse to the oscillatory member is in circuit, means forming an auxiliary interrupter located in the electric circuit and having sides alternately operable by the movement of the oscillatory member whose amplitude is to be regulated, so that the circuit can be opened when the amplitude has been exceeded and kept open until the amplitude has been reduced.

2. In electro-magnetic clocks a pendulum amplitude regulator comprising an auxiliary interrupter formed by a pivoted contact arm, operable by the oscillation of the pendulum, and a stationary contacting surface formed of conducting and insulating portions upon which one end of the contact arm is adapted to rub to make and break circuit; fingers arranged at the other end of the pivoted contact arm between which the pendulum swings; a coil; a battery in circuit with said coil; a main interrupter in circuit with said coil; a lead from the battery to the stationary conducting surface and a lead from the main interrupter to the pivoted contact arm.

3. In electro-magnetic clocks a pendulum amplitude regulator comprising an auxiliary interrupter consisting of a pivoted contact arm, operable by the oscillation of the pendulum, and a stationary contacting surface formed of conducting and insulating portions upon which one end of the contact arm is adapted to rub to make and break circuit; fingers arranged at the other end of the pivoted contact arm between which the pendulum swings; a coil; a battery in circuit with said coil; a main interrupter in circuit with said coil and in series with the auxiliary interrupter; a lead from the battery to the stationary conducting surface and a lead from the main interrupter to the pivoted contact arm.

4. In electro-magnetic clocks a pendulum amplitude regulator comprising an auxiliary interrupter consisting of a pivoted contact arm, operable by the oscillation of the pendulum, and a stationary contacting surface formed of conducting and insulating portions upon which one end of the contact arm is adapted to rub to make and break circuit; fingers arranged at the other end of the pivoted contact arm between which the pendulum swings; a coil; a battery in circuit with said coil; a main interrupter in circuit with said coil and in series with the auxiliary interrupter; a lead from the battery to the stationary conducting surface, a lead from the main interrupter to the pivoted contact arm; and a resistance to shunt the auxiliary interrupter.

In testimony whereof I have signed my name to this specification.

MAURICE PHILIPPE FAVRE-BULLE.